United States Patent
Sun (10) Patent No.: US 10,255,017 B2
(45) Date of Patent: Apr. 9, 2019

(54) SPLICING SCREEN, METHOD FOR DETERMINING ADDRESS OF EACH SPLICING SCREEN UNIT AND MASTER CONTROL BOARD

(71) Applicant: BOE TECHNOLOGY GROUP CO., LTD., Beijing (CN)

(72) Inventor: Jie Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 378 days.

(21) Appl. No.: 15/150,952

(22) Filed: May 10, 2016

(65) Prior Publication Data

US 2016/0364196 A1    Dec. 15, 2016

(30) Foreign Application Priority Data

Jun. 9, 2015    (CN) .......................... 2015 1 0313766

(51) Int. Cl.
     *G06F 3/14*      (2006.01)
     *G09G 5/00*      (2006.01)

(52) U.S. Cl.
     CPC ........... *G06F 3/1446* (2013.01); *G09G 5/003* (2013.01); *G09G 5/006* (2013.01);
     (Continued)

(58) Field of Classification Search
     CPC ...... G06F 3/1446; G09G 5/006; G09G 5/003; G09G 2356/00; G09G 2310/0221; G09G 2300/026
     See application file for complete search history.

(56) References Cited

U.S. PATENT DOCUMENTS

2004/0228077 A1    11/2004    Hall et al.
2013/0033415 A1*    2/2013    Chang ................... G06F 3/1431
                                               345/1.3
(Continued)

FOREIGN PATENT DOCUMENTS

CN      101656050 A      2/2010
CN      102184062 A      9/2011
(Continued)

OTHER PUBLICATIONS

First Office Action for Chinese Application No. 201510313766.X, dated May 25, 2017, 8 Pages.

*Primary Examiner* — Andrew Sasinowski
(74) *Attorney, Agent, or Firm* — Brooks Kushman P.C.

(57) ABSTRACT

The present disclosure provides a splicing screen, a method for determining an address of each splicing screen unit and a master control board. The splicing screen includes a plurality of splicing screen units which are spliced together. Each splicing screen unit includes a master control board, a gravity sensor coupled with the master control board, infrared emitters and infrared receivers. The infrared emitters and the infrared receivers are divided into four groups each including one infrared emitter and one infrared receiver; the four groups are at four sides including top, bottom, left and right sides of each splicing screen unit, respectively. At adjacent sides of adjacent two splicing screen units, two groups have an identical horizontal position or an identical vertical position. In adjacent two splicing screen units, signal is capable of being transmitted among infrared emitters and infrared receivers of only two groups at adjacent sides of adjacent two splicing screen units.

12 Claims, 4 Drawing Sheets

(52) U.S. Cl.
CPC ............... *G09G 2300/026* (2013.01); *G09G 2310/0221* (2013.01); *G09G 2356/00* (2013.01)

(56) References Cited

U.S. PATENT DOCUMENTS

2014/0185222 A1    7/2014  Hung et al.
2016/0163018 A1*   6/2016  Wang .................. G06T 1/20
                                                345/504

FOREIGN PATENT DOCUMENTS

| | | |
|---|---|---|
| CN | 102426774 A | 4/2012 |
| CN | 102508580 A | 6/2012 |
| CN | 102736885 A | 10/2012 |
| CN | 203242247 U | 10/2013 |
| CN | 103902195 A | 7/2014 |
| CN | 104317544 A | 1/2015 |
| JP | 2012008954 A | 1/2012 |

\* cited by examiner

SPLICING SCREEN, METHOD FOR DETERMINING ADDRESS OF EACH SPLICING SCREEN UNIT AND MASTER CONTROL BOARD

CROSS REFERENCE OF RELATED APPLICATION

This application claims priority to Chinese Patent Application No. 201510313766.X, filed with the Chinese State Intellectual Property Office on Jun. 9, 2015, which is incorporated by reference in its entirety herein.

TECHNICAL FIELD

The disclosure generally relates to the field of display technology, and in particular to a splicing screen, a method for determining an address of each splicing screen unit and a master control board.

BACKGROUND

Figure 1:
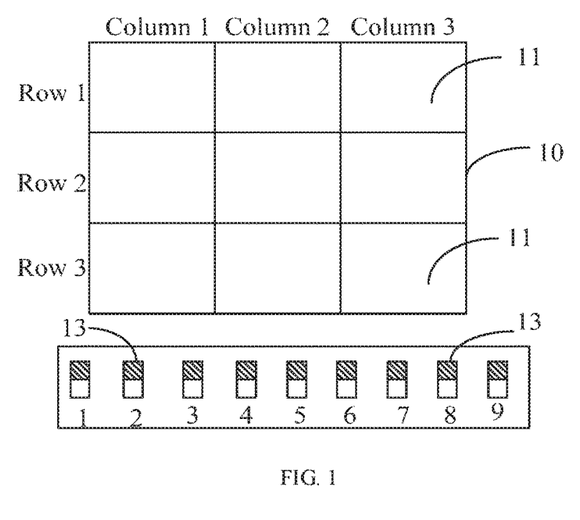
FIG. 1 is a schematic structural diagram of a splicing screen in the related art.

Splicing screens may be divided into liquid crystal splicing screens, plasma splicing screens or transparent screens. A liquid crystal splicing screen will be taken as an example for illustration. One splicing screen unit is a complete liquid crystal display unit, which not only can be used alone as a displayer, but also can be spliced with other splicing screen units to form a large screen. In order to meet different needs, it can act as single-screen split display, single-screen alone, any combination of display, the splicing of the full-screen, vertical screen. In order to achieve single-screen alone or any combination of display, it is needed to determine address of each splicing screen unit, thereby facilitating displaying in a variety of manners. However, in the related art, the address of each splicing screen unit in the splicing screen is set manually, which is complicated and error prone. For example, referring to FIG. 1, one splicing screen 10 includes nine splicing screen units 11. Each splicing screen unit 11 corresponds to one switch 13. When determining the address of each splicing screen unit 11, it is needed to manually turn on corresponding switch 13, which is complicated.

As described above, when determining the address of each splicing screen unit in the related art, it is needed to manually turn on corresponding switch, which is complicated and error prone.

SUMMARY

Embodiments of the present disclosure provide a splicing screen, a method for determining an address of each splicing screen unit and a master control board, so as to provide a splicing screen, which can automatically identify an address of each splicing screen unit, thereby simplifying the process of determining addresses of splicing screen units and improving accuracy of results.

One embodiment of the present disclosure provides a splicing screen, including a plurality of splicing screen units which are spliced together. Each splicing screen unit includes a master control board, a gravity sensor coupled with the master control board, infrared emitters and infrared receivers. The infrared emitters and the infrared receivers are divided into four groups each including one infrared emitter and one infrared receiver; the four groups are at four sides including top, bottom, left and right sides of each splicing screen unit, respectively. At adjacent sides of adjacent two splicing screen units, two groups have an identical horizontal position or an identical vertical position. In adjacent two splicing screen units, signal is capable of being transmitted among infrared emitters and infrared receivers of only two groups at adjacent sides of adjacent two splicing screen units.

In one embodiment of the present disclosure, installation modes of the splicing screen units are determined by the gravity sensors of the splicing screen units; one splicing screen unit, which is located in the first row and the first column of the splicing screen, is determined according to data transmitting and receiving between the infrared emitter and the infrared receiver of each group as well as between the infrared emitters and the infrared receivers of two groups at adjacent sides of adjacent two splicing screen units. Then, the address of each splicing screen unit is determined according to commands sent and received by the infrared emitters and the infrared receivers. As a result, the address of each splicing screen unit can be automatically identified, thereby simplifying the process of determining addresses of the splicing screen units and improving accuracy of results.

Optionally, the gravity sensor is at a central position of the splicing screen unit.

Optionally, the four groups are at central positions of the top, bottom, left and right sides of the splicing screen unit, respectively.

Optionally, two groups at adjacent sides of two splicing screen units adjacent along the horizontal direction have an identical vertical position; the infrared emitter and the infrared receiver of each of the two groups at adjacent sides of two splicing screen units adjacent along the horizontal direction have an identical horizontal position.

Optionally, two groups at adjacent sides of two splicing screen units adjacent along the vertical direction have an identical horizontal position; the infrared emitter and the infrared receiver of each of the two groups at adjacent sides of two splicing screen units adjacent along the vertical direction have an identical vertical position.

One embodiment of the present disclosure provides a method for determining an address of each splicing screen unit of the splicing screen, including: for each splicing screen unit, the master control board of the each splicing screen unit performing steps of: determining an installation mode of the splicing screen unit based on data obtained from the gravity sensor of the splicing screen unit; sending a command for acquiring address to each infrared emitter of the splicing screen unit; receiving address data sent from the infrared receivers of the splicing screen unit, and determining whether the splicing screen unit is in the first row and the first column according to the address data and the installation mode, wherein the address data from one infrared receiver indicates a position of the one infrared receiver and is obtained by the one infrared receiver according to a command for acquiring address received by the one infrared receiver from one infrared emitter at an adjacent side of an adjacent splicing screen unit; when determining that the splicing screen unit is in the first row and the first column, sending an address identification command of the splicing screen unit to an adjacent splicing screen unit in an adjacent row and an adjacent splicing screen unit in an adjacent column; when determining that the splicing screen unit is not in the first row and the first column, determining an address of the splicing screen unit according to address identification commands received from adjacent splicing screen units in an adjacent row and/or an adjacent column as well as the address data sent from the infrared receivers in the splicing screen unit, and sending an address identification command carrying address information of the splicing screen unit to the adjacent splicing screen unit in the adjacent row and the adjacent splicing screen unit in the adjacent column.

In the method for determining the address of each splicing screen unit in the splicing screen according to one embodiment of the present disclosure, after the master control board of the splicing screen unit determines the installation mode of the splicing screen unit according to the data received from the gravity sensor of the splicing screen unit, the master control board sends one command for acquiring address to each infrared emitter of the splicing screen unit. Then, each infrared emitter sends the command for acquiring address to the infrared receiver which belongs to the same group as the each infrared emitter or in a group different from the group to which the each infrared emitter belongs. When the master control board determines that the address of the splicing screen unit is the first row and the first column according to address data sent from the infrared receivers in the splicing screen unit as well as the installation mode, the master control board sends an address identification command of the splicing screen unit to an adjacent splicing screen unit in an adjacent row and an adjacent splicing screen unit in an adjacent column, to enable the adjacent splicing screen unit in the adjacent row and the adjacent splicing screen unit in the adjacent column to identify their own address. When the master control board determines that the address of the splicing screen unit is not the first row and the first column, the master control board determines an address of the splicing screen unit according to address identification commands received from adjacent splicing screen units in an adjacent row and/or an adjacent column as well as the address data sent from the infrared receivers in the splicing screen unit. As a result, each splicing screen unit can automatically identify its own address, thereby simplifying the process of determining addresses of the splicing screen units and improving accuracy of results.

Optionally, the command for acquiring address includes: state of first-row-first-column identification stage of the splicing screen unit which sends the command for acquiring address, and random number; wherein the random number is used to determine whether one infrared emitter which forwards the command for acquiring address and one infrared receiver which receives the command for acquiring address belong to an identical group; the address data sent from one infrared receiver is address data which indicates a position of the one infrared receiver and which is sent from the one infrared receiver when the one infrared receiver determines, according to the random number in the command for acquiring address, that the one infrared receiver which receives the command for acquiring address and one infrared emitter which forwards the command for acquiring address belong to different groups.

Optionally, the address identification command includes row information and column information of the splicing screen unit which sends the address identification command, and random number; wherein the random number is used to determine whether one infrared emitter which forwards the address identification command and one infrared receiver which receives the address identification command belong to an identical group; the step of determining an address of the splicing screen unit according to address identification commands received from adjacent splicing screen units in an adjacent row and/or an adjacent column as well as the address data sent from the infrared receivers in the splicing screen unit, includes: when determining that one infrared emitter which forwards one address identification command and one infrared receiver which receives the one address identification command belong to different groups according to the random number included in the one address identification command sent from one adjacent splicing screen unit in an adjacent row or an adjacent column, determining an address of the splicing screen unit according to row information and column information of the one address identification command as well as the address data sent from the infrared receivers in the splicing screen unit.

Optionally, the step of determining whether the splicing screen unit is in the first row and the first column according to the address data and the installation mode includes: when determining that the splicing screen unit is in the horizontal screen installation mode and receiving address data only from infrared receivers at the bottom side and the right side of the splicing screen unit, determining that the splicing screen unit is in the first row and the first column; or, when determining that the splicing screen unit is in the vertical screen installation mode and receiving address data only from infrared receivers at the top side and the right side of the splicing screen unit, determining that the splicing screen unit is in the first row and the first column.

Optionally, the step of sending an address identification command of the splicing screen unit to the adjacent splicing screen unit in the adjacent row and the adjacent splicing screen unit in the adjacent column, includes: sending, by the infrared emitter at the right side of the splicing screen unit, the address identification command of the splicing screen unit to the infrared receiver at the left side of one adjacent splicing screen unit in the adjacent column or row; sending, by the infrared emitter at the bottom side of the splicing screen unit, the address identification command of the splicing screen unit to the infrared receiver at the top side of one adjacent splicing screen unit in the adjacent row or column.

Optionally, the address identification commands received from adjacent splicing screen units in the adjacent row and/or the adjacent column include: an address identification command received by the infrared receiver at the top side of the splicing screen unit from the infrared emitter at the bottom side of one adjacent splicing screen unit in the adjacent row or column; and/or, an address identification command received by the infrared receiver at the left side of the splicing screen unit from the infrared emitter at the right side of one adjacent splicing screen unit in the adjacent column or row.

One embodiment of the present disclosure provides a master control board for each splicing screen unit of the splicing screen, the master control board including: an installation mode determination unit configured to determine an installation mode of the splicing screen unit based on data obtained from the gravity sensor of the splicing screen unit; a sending unit configured to send a command for acquiring address to each infrared emitter of the splicing screen unit; a first-row-first-column determination unit configured to receive address data sent from the infrared receivers of the splicing screen unit, and determine whether the splicing screen unit is in the first row and the first column according to the address data and the installation mode; wherein the address data from one infrared receiver indicates a position of the one infrared receiver and is obtained by the one infrared receiver according to a command for acquiring address received by the one infrared receiver from one infrared emitter at an adjacent side of an adjacent splicing screen unit; an address determination unit configured to, when determining that the splicing screen unit is in the first row and the first column, send an address identification command of the splicing screen unit to an adjacent splicing screen unit in an adjacent row and an adjacent splicing screen unit in an adjacent column; when determining that the splicing screen unit is not in the first row and the first column, determine an address of the splicing screen unit according to address identification commands received from adjacent splicing screen units in an adjacent row and/or an adjacent column as well as the address data sent from the infrared receivers in the splicing screen unit, and send an address identification command carrying address information of the splicing screen unit to an adjacent splicing screen unit in an adjacent row and an adjacent splicing screen unit in an adjacent column.

In one embodiment of the present disclosure, after the master control board of the splicing screen unit determines the installation mode of the splicing screen unit according to the data received from the gravity sensor of the splicing screen unit, the master control board sends one command for acquiring address to each infrared emitter of the splicing screen unit. Then, each infrared emitter sends the command for acquiring address to the infrared receiver which belongs to the same group as the each infrared emitter or in a group different from the group to which the each infrared emitter belongs. When the master control board determines that the address of the splicing screen unit is the first row and the first column according to address data sent from the infrared receivers in the splicing screen unit as well as the installation mode, the master control board sends an address identification command of the splicing screen unit to an adjacent splicing screen unit in an adjacent row and an adjacent splicing screen unit in an adjacent column, to enable the adjacent splicing screen unit in the adjacent row and the adjacent splicing screen unit in the adjacent column to identify their own address. When the master control board determines that the address of the splicing screen unit is not the first row and the first column, the master control board determines an address of the splicing screen unit according to address identification commands received from adjacent splicing screen units in an adjacent row and/or an adjacent column as well as the address data sent from the infrared receivers in the splicing screen unit. As a result, each splicing screen unit can automatically identify its own address, thereby simplifying the process of determining addresses of the splicing screen units and improving accuracy of results.

Optionally, the command for acquiring address includes: state of first-row-first-column identification stage of the splicing screen unit which sends the command for acquiring address, and random number; the random number is used to determine whether one infrared emitter which forwards the command for acquiring address and one infrared receiver which receives the command for acquiring address belong to an identical group; the address data sent from one infrared receiver is address data which indicates a position of the one infrared receiver and which is sent from the one infrared receiver when the one infrared receiver determines, according to the random number in the command for acquiring address, that the one infrared receiver which receives the command for acquiring address and one infrared emitter which forwards the command for acquiring address belong to different groups.

Optionally, the address identification command includes row information and column information of the splicing screen unit which sends the address identification command, and random number; the random number is used to determine whether one infrared emitter which forwards the address identification command and one infrared receiver which receives the address identification command belong to an identical group; a way in which the address determination unit determines the address of the splicing screen unit according to address identification commands received from adjacent splicing screen units in the adjacent row and/or the adjacent column as well as the address data sent from the infrared receivers in the splicing screen unit, includes: when determining that one infrared emitter which forwards one address identification command and one infrared receiver which receives the one address identification command belong to different groups according to the random number included in the one address identification command sent from one adjacent splicing screen unit in the adjacent row or the adjacent column, determining the address of the splicing screen unit according to row information and column information of the one address identification command as well as the address data sent from the infrared receivers in the splicing screen unit.

Optionally, a way in which the first-row-first-column determination unit determines whether the splicing screen unit is in the first row and the first column according to the address data and the installation mode includes: when determining that the splicing screen unit is in the horizontal screen installation mode and receiving address data only from infrared receivers at the bottom side and the right side of the splicing screen unit, determining that the splicing screen unit is in the first row and the first column; or, when determining that the splicing screen unit is in the vertical screen installation mode and receiving address data only from infrared receivers at the top side and the right side of the splicing screen unit, determining that the splicing screen unit is in the first row and the first column.

Optionally, a way in which the address determination unit sends the address identification command of the splicing screen unit to the adjacent splicing screen unit in the adjacent row and the adjacent splicing screen unit in the adjacent column, includes: sending, by the infrared emitter at the right side of the splicing screen unit, the address identification command of the splicing screen unit to the infrared receiver at the left side of one adjacent splicing screen unit in the adjacent column or row; sending, by the infrared emitter at the bottom side of the splicing screen unit, the address identification command of the splicing screen unit to the infrared receiver at the top side of one adjacent splicing screen unit in the adjacent row or column.

Optionally, the address identification commands received by the address determination unit from adjacent splicing screen units in the adjacent row and/or the adjacent column include: an address identification command received by the infrared receiver at the top side of the splicing screen unit from the infrared emitter at the bottom side of one adjacent splicing screen unit in the adjacent row or column; and/or, an address identification command received by the infrared receiver at the left side of the splicing screen unit from the infrared emitter at the right side of one adjacent splicing screen unit in the adjacent column or row.

DETAILED DESCRIPTION

In order to make the technical issues, the technical solutions and the advantages of the present disclosure more apparent, the present disclosure will be described in detail hereinafter in conjunction with the drawings and embodiments. It is obvious that the described embodiments are merely some of all the embodiments of the present disclosure instead of all the embodiments. All of other embodiments that those skilled in the art may implement based on the embodiments in the present disclosure without creative work should also fall within the scope of the present disclosure.

The present disclosure provides in some embodiments a splicing screen, a method for determining an address of each splicing screen unit and a master control board, so as to provide a splicing screen which can automatically identify an address of each splicing screen unit, thereby simplifying the process of determining addresses of splicing screen units and improving accuracy of results.

The technical solutions of the present disclosure will be described in detail hereinafter in conjunction with the drawings.

Figure 2:
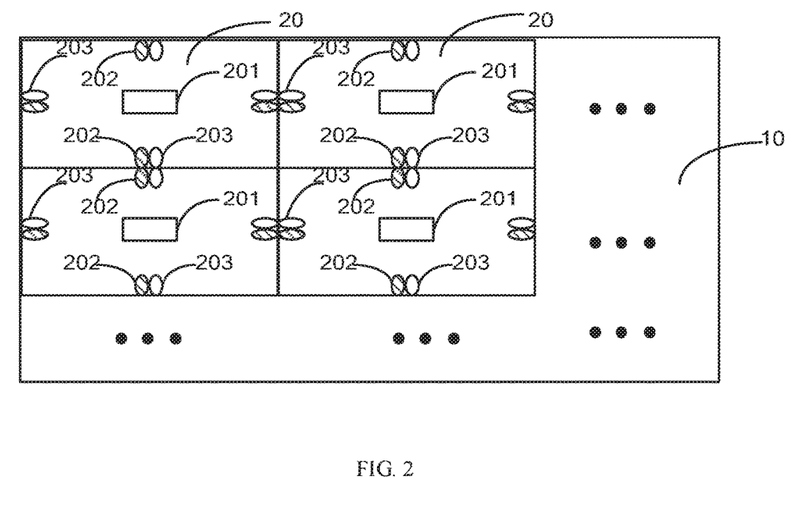
FIG. 2 is a schematic structural diagram of a splicing screen according to one embodiment of the present disclosure.

Referring to FIG. 2, one embodiment of the present disclosure provides a splicing screening 10. The splicing screen 10 includes a plurality of splicing screen units 20 which are spliced together. Each splicing screen unit includes a master control board at a lower layer of each splicing screen unit, a gravity sensor 201 coupled with the master control board, infrared emitters 202 and infrared receivers 203.

One infrared emitter 202 and one infrared receiver 203 define one group, and there are four groups at four sides including top, bottom, left and right sides of each splicing screen unit, respectively. At adjacent sides of adjacent two splicing screen units, two groups have an identical horizontal position or an identical vertical position. In adjacent two splicing screen units, signal can be transmitted among infrared emitters 202 and infrared receivers 203 of only two groups at adjacent sides of adjacent two splicing screen units.

The gravity sensor 201 is at a central position of the splicing screen unit 20. The four groups of infrared emitters 202 and infrared receivers 203 are at central positions of the top, bottom, left and right sides of each splicing screen unit, respectively.

It should be noted, each group of the infrared emitter 202 and the infrared receiver 203 may be not at the central position of a corresponding one of the four sides of each splicing screen unit, and may be at a position above or below the central position of the corresponding one of the four sides of each splicing screen unit, as long as at adjacent sides of adjacent two splicing screen units, two groups have an identical horizontal position or an identical vertical position.

Further, in one embodiment of the present disclosure, in each of the groups at four sides of each splicing screen unit, signal may be transmitted between the infrared emitter 202 and the infrared receiver 203 of the each of the groups. Signal can also be transmitted among infrared emitters 202 and infrared receivers 203 of two groups at adjacent sides of adjacent two splicing screen units.

In one embodiment of the present disclosure, installation modes of the splicing screen units are determined by the gravity sensors 201 of the splicing screen units; one splicing screen unit, which is located in the first row and the first column of the splicing screen, is determined according to data transmitting and receiving between the infrared emitter 202 and the infrared receiver 203 of each group as well as between the infrared emitters 202 and the infrared receivers 203 of two groups at adjacent sides of adjacent two splicing screen units. Then, the address of each splicing screen unit is determined according to commands sent and received by the infrared emitters and the infrared receivers. As a result, the address of each splicing screen unit can be automatically identified, thereby simplifying the process of determining addresses of the splicing screen units and improving accuracy of results.

It should be noted, in one embodiment of the present disclosure, the splicing screen may be a liquid crystal splicing screen, a plasma splicing screen or a transparent screen, which is not specifically limited herein.

Figure 3:
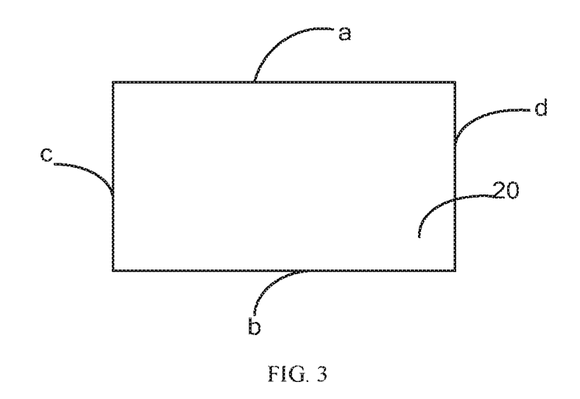
FIG. 3 is a schematic structural diagram of a splicing screen unit in a horizontal screen installation mode according to one embodiment of the present disclosure.
Figure 4:
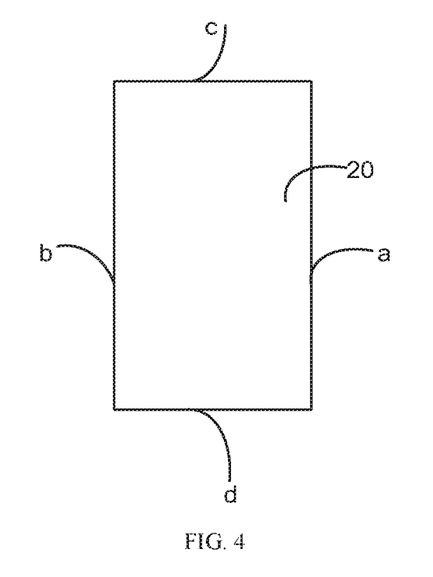
FIG. 4 is a schematic structural diagram of the splicing screen unit in a vertical screen installation mode according to one embodiment of the present disclosure.

Specifically, in one embodiment of the present disclosure, the installation modes of the splicing screen include a horizontal screen installation mode and a vertical screen installation mode. The four groups of infrared emitters 202 and infrared receivers 203 are at central positions of the top, bottom, left and right sides of each splicing screen unit, respectively. Referring to FIG. 3, when one splicing screen unit 20 is in the horizontal screen installation mode, the top side of the splicing screen unit 20 is the side a, the bottom side of the splicing screen unit 20 is the side b, the left side of the splicing screen unit 20 is the side c and the right side of the splicing screen unit 20 is the side d. Referring to FIG. 4, when the splicing screen unit 20 is in the vertical screen installation mode, the side a is still referred as the top side of the splicing screen unit 20, the side b is still referred as the bottom side of the splicing screen unit 20, the side c is still referred as the left side of the splicing screen unit 20 and the side d is still referred as the right side of the splicing screen unit 20. As can be seen from FIG. 3 and FIG. 4, no matter in which of the installation modes the splicing screen unit is, the top, bottom, left and right sides of the splicing screen unit are fixed and not changed when the installation mode is changed. Thus, during the process of determining the address of the splicing screen unit, it is needed to consider the installation mode of the splicing screen unit.

Figure 5:
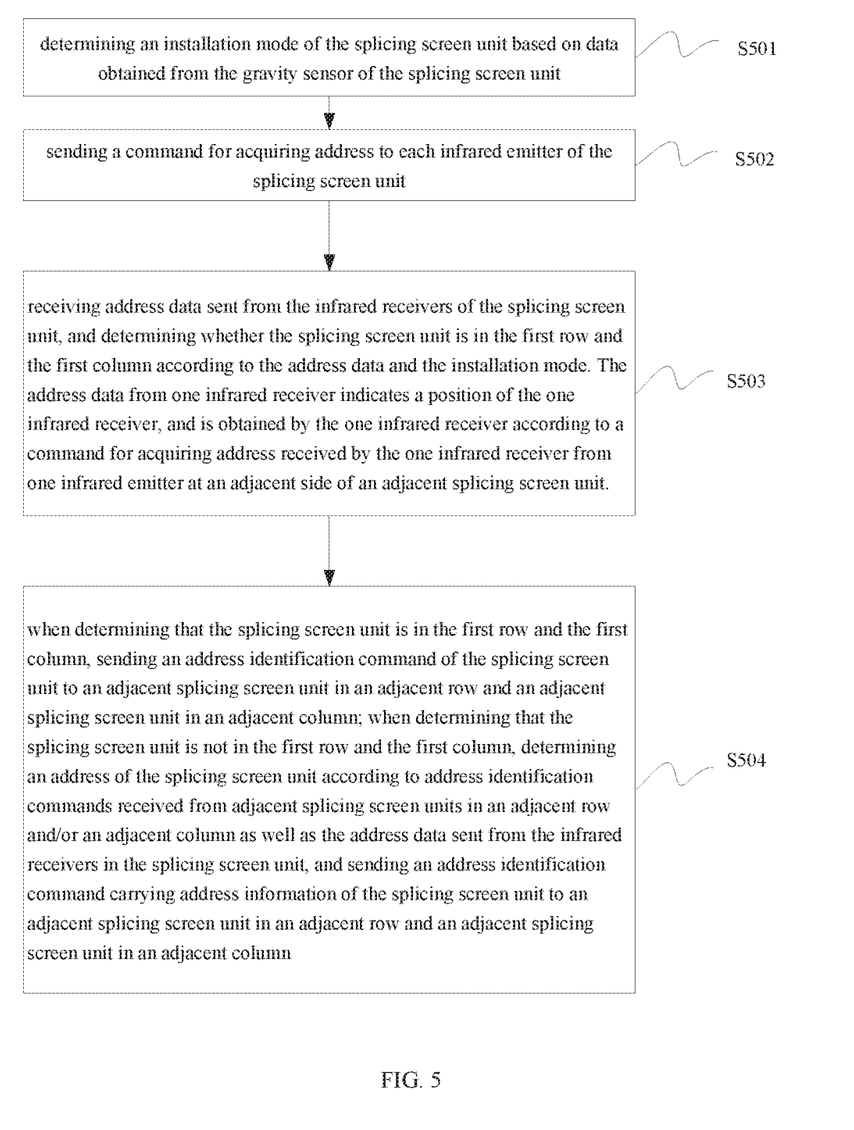
FIG. 5 is a flow chart of a method for determining an address of each splicing screen unit according to one embodiment of the present disclosure.

Referring to FIG. 5, which is a flow chart of a method for determining an address of each splicing screen unit of a splicing screen according to one embodiment of the present disclosure. The splicing screen may be the above splicing screen. For each splicing screen unit, the master control board of the each splicing screen unit performs following steps.

Step S501 is to determine an installation mode of the splicing screen unit based on data obtained from the gravity sensor of the splicing screen unit.

The installation mode is the horizontal screen installation mode or the vertical screen installation mode. Before the step S501, one computer sends a command for acquiring data to each splicing screen unit through a serial port. After each splicing screen unit receives this command, the master control board sends a command for acquiring installation mode to the gravity sensor. The gravity sensor acquires data and sends the obtained data to the master control board. The master control board determines the installation mode of the splicing screen unit based on the data obtained from the gravity sensor of the splicing screen unit according to a calculation method in the related art.

Step S502 is to send a command for acquiring address to each infrared emitter of the splicing screen unit.

The command for acquiring address includes: state of first-row-first-column identification stage of the splicing screen unit which sends the command for acquiring address, and random number. The random number is used to determine whether one infrared emitter which forwards the command for acquiring address and one infrared receiver which receives the command for acquiring address belong to an identical group. The state of first-row-first-column identification stage is used to explain that this command is to identify one splicing screen unit which is located in the first row and the first column of the splicing screen.

Step S503 is to receive address data sent from the infrared receivers of the splicing screen unit, and determine whether the splicing screen unit is in the first row and the first column according to the address data and the installation mode. The address data from one infrared receiver indicates a position of the one infrared receiver, and is obtained by the one infrared receiver according to a command for acquiring address received by the one infrared receiver from one infrared emitter at an adjacent side of an adjacent splicing screen unit.

The address data sent from one infrared receiver may be address data indicating a position of the one infrared receiver at the splicing screen unit, which is sent from the one infrared receiver when the one infrared receiver determines, according to the random number in the command for acquiring address, that the one infrared receiver which receives the command for acquiring address and one infrared emitter which forwards the command for acquiring address belong to different groups. For example, when one infrared receiver in one group receives the command for acquiring address from one infrared emitter in another group, the one infrared receiver generates address data representing a position of the one infrared receiver, and sends the generated address data to the master control board. For example, the address data includes that the one infrared receiver is at the top side, the bottom side, the left side or the right side of the splicing screen unit.

The step of determining whether the splicing screen unit is in the first row and the first column according to the address data and the installation mode includes: when determining that the splicing screen unit is in the horizontal screen installation mode and receiving address data only from infrared receivers at the bottom side and the right side of the splicing screen unit, determining that the splicing screen unit is in the first row and the first column; or, when determining that the splicing screen unit is in the vertical screen installation mode and receiving address data only from infrared receivers at the top side and the right side of the splicing screen unit, determining that the splicing screen unit is in the first row and the first column.

For example, when determining that the splicing screen unit is in the horizontal screen installation mode and receiving address data only from infrared receivers at the top side and the left side of the splicing screen unit, it is determined that the splicing screen unit is in the last row and the last column; when receiving address data only from infrared receivers at the right side and the top side of the splicing screen unit, it is determined that the splicing screen unit is in the last row and the first column; when receiving address data only from infrared receivers at the left side and the bottom side of the splicing screen unit, it is determined that the splicing screen unit is in the first row and the last column.

For example, when determining that the splicing screen unit is in the vertical screen installation mode and receiving address data only from infrared receivers at the bottom side and the left side of the splicing screen unit, it is determined that the splicing screen unit is in the last row and the last column; when receiving address data only from infrared receivers at the left side and the top side of the splicing screen unit, it is determined that the splicing screen unit is in the last row and the first column; when receiving address data only from infrared receivers at the right side and the bottom side of the splicing screen unit, it is determined that the splicing screen unit is in the first row and the last column.

Step S504 is to, when determining that the splicing screen unit is in the first row and the first column, send an address identification command of the splicing screen unit to an adjacent splicing screen unit in an adjacent row and an adjacent splicing screen unit in an adjacent column; when determining that the splicing screen unit is not in the first row and the first column, determine an address of the splicing screen unit according to address identification commands received from adjacent splicing screen units in an adjacent row and/or an adjacent column as well as the address data sent from the infrared receivers in the splicing screen unit, and send an address identification command carrying address information of the splicing screen unit to an adjacent splicing screen unit in an adjacent row and an adjacent splicing screen unit in an adjacent column.

In the step S504, the address identification command includes row information, column information, state of row-column identification stage of the splicing screen unit which sends the address identification command, and random number. The random number is used to determine whether one infrared emitter which forwards the address identification command and one infrared receiver which receives the address identification command belong to an identical group. The state of row-column identification stage is used to confirm that the address identification command is to identify one splicing screen unit in each row and the each column.

The step of determining an address of the splicing screen unit according to address identification commands received from adjacent splicing screen units in an adjacent row and/or an adjacent column as well as the address data sent from the infrared receivers in the splicing screen unit, includes: when determining that one infrared emitter which forwards one address identification command and one infrared receiver which receives the one address identification command belong to different groups according to the random number included in the one address identification command sent from one adjacent splicing screen unit in an adjacent row or an adjacent column, determining an address of the splicing screen unit according to row information and column information of the one address identification command as well as the address data sent from the infrared receivers in the splicing screen unit.

The step of sending an address identification command of the splicing screen unit to an adjacent splicing screen unit in an adjacent row and an adjacent splicing screen unit in an adjacent column, includes: sending, by the infrared emitter at the right side of the splicing screen unit, the address identification command of the splicing screen unit to the infrared receiver at the left side of one adjacent splicing screen unit in the adjacent column or row; sending, by the infrared emitter at the bottom side of the splicing screen unit, the address identification command of the splicing screen unit to the infrared receiver at the top side of one adjacent splicing screen unit in the adjacent row or column.

The address identification commands received from adjacent splicing screen units in an adjacent row and/or an adjacent column include: an address identification command received by the infrared receiver at the top side of the splicing screen unit from the infrared emitter at the bottom side of one adjacent splicing screen unit in the adjacent row or column; and/or, an address identification command received by the infrared receiver at the left side of the splicing screen unit from the infrared emitter at the right side of one adjacent splicing screen unit in the adjacent column or row.

In the method for determining the address of each splicing screen unit in the splicing screen according to one embodiment of the present disclosure, after the master control board of the splicing screen unit determines the installation mode of the splicing screen unit according to the data received from the gravity sensor of the splicing screen unit, the master control board sends one command for acquiring address to each infrared emitter of the splicing screen unit. Then, each infrared emitter sends the command for acquiring address to the infrared receiver which belongs to the same group as the each infrared emitter or in a group different from the group to which the each infrared emitter belongs. When the master control board determines that the address of the splicing screen unit is the first row and the first column according to address data sent from the infrared receivers in the splicing screen unit as well as the installation mode, the master control board sends an address identification command of the splicing screen unit to an adjacent splicing screen unit in an adjacent row and an adjacent splicing screen unit in an adjacent column, to enable the adjacent splicing screen unit in the adjacent row and the adjacent splicing screen unit in the adjacent column to identify their own address. When the master control board determines that the address of the splicing screen unit is not the first row and the first column, the master control board determines an address of the splicing screen unit according to address identification commands received from adjacent splicing screen units in an adjacent row and/or an adjacent column as well as the address data sent from the infrared receivers in the splicing screen unit. As a result, each splicing screen unit can automatically identify its own address, thereby simplifying the process of determining addresses of the splicing screen units and improving accuracy of results.

The process of determining the address of each splicing screen unit in the splicing screen will be described in details hereinafter.

Figure 6:
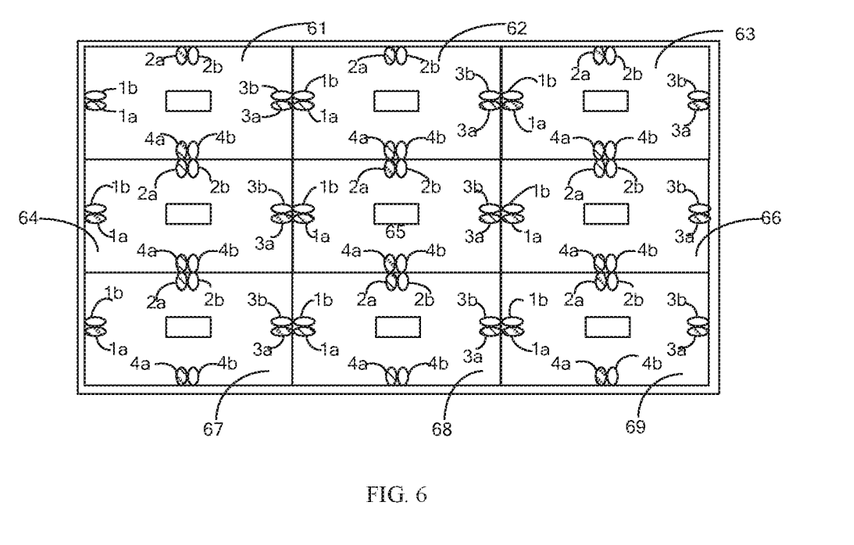
FIG. 6 is a schematic structural diagram of a method for determining an address of each splicing screen unit according to one embodiment of the present disclosure.

FIG. 6 is a schematic diagram of a method for determining an address of each splicing screen unit in one splicing screen according to one embodiment of the present disclosure. Referring to FIG. 6, the splicing screen includes nine splicing screen units. The splicing screen unit 61 is in the first row and the first column. The splicing screen unit 62 is in the first row and the second column. The splicing screen unit 63 is in the first row and the third column. The splicing screen unit 64 is in the second row and the first column. The splicing screen unit 65 is in the second row and the second column. The splicing screen unit 66 is in the second row and the third column. The splicing screen unit 67 is in the third row and the first column. The splicing screen unit 68 is in the third row and the second column. The splicing screen unit 69 is in the third row and the third column. Each splicing screen unit includes four infrared emitters and four infrared receivers. The master control board of each splicing screen unit performs following steps.

At step one, the master control board of the each splicing screen unit obtains data from the gravity sensor 201 of the splicing screen unit, and determines an installation mode of the splicing screen unit based on the data.

For example, the splicing screen unit in FIG. 6 is in the horizontal installation mode.

At step two, the master control board of the each splicing screen unit sends a command for acquiring address to each infrared emitter of the splicing screen unit, and the each infrared emitter forwards the command for acquiring address to the infrared receiver which belongs to the same group as the each infrared emitter or belongs to a group at an adjacent side of an adjacent splicing screen unit. For example, the infrared receiver 3*b* at the right side of the splicing screen unit 61 receives the command for acquiring address sent from the infrared emitter 3*a* which belongs to the same group as the infrared receiver 3*b*, and receives the command for acquiring address sent from the infrared emitter 1*a* at the left side of the adjacent splicing screen unit 62. Meanwhile, the infrared receiver 1*b* at the left side of the splicing screen unit 62 receives the command for acquiring address sent from the infrared emitter 1*a* which belongs to the same group as the infrared receiver 1*b*, and receives the command for acquiring address sent from the infrared emitter 3*a* of the splicing screen unit 61.

At step three, when one of the infrared receivers 1*b*, 2*b*, 3*b* and 4*b* of the splicing screen unit receives one command for acquiring address sent from the infrared emitter of one group at an adjacent side of an adjacent splicing screen unit, the one of the infrared receivers 1*b*, 2*b*, 3*b* and 4*b* of the splicing screen unit generates its own address data, and sends the generated address data to the master control board of the splicing screen unit where the one of the infrared receivers 1*b*, 2*b*, 3*b* and 4*b* of the splicing screen unit is.

For example, taking the splicing screen unit 64 as an example, the infrared receiver 1*b* of the splicing screen unit 64 receives the command for acquiring address sent from the infrared emitter 1*a* of the splicing screen unit 64; the infrared receiver 2*b* of the splicing screen unit 64 receives the commands for acquiring address sent from the infrared emitter 2*a* of the splicing screen unit 64 and the infrared emitter 4*a* of the splicing screen unit 64. The infrared receiver 3*b* of the splicing screen unit 64 receives the commands for acquiring address sent from the infrared emitter 3*a* of the splicing screen unit 64 and the infrared emitter 1*a* of the splicing screen unit 65. The infrared receiver 4*b* of the splicing screen unit 64 receives the commands for acquiring address sent from the infrared emitter 4*a* of the splicing screen unit 64 and the infrared emitter 2*a* of the splicing screen unit 67. Then, the infrared receivers 2*b*, 3*b* and 4*b* of the splicing screen unit 64 generate their own address data, respectively. The address data generated by the infrared receiver 2*b* carries information that the infrared receiver 2*b* is at the top side of the splicing screen unit 64. The address data generated by the infrared receiver 3*b* carries information that the infrared receiver 3*b* is at the right side of the splicing screen unit 64. The address data generated by the infrared receiver 4*b* carries information that the infrared receiver 4*b* is at the bottom side of the splicing screen unit 64.

At step four, the master control board of the each splicing screen unit determines whether the splicing screen unit is in the first row and the first column, according to the address data obtained from the infrared emitters as well as the installation mode of the splicing screen unit. The manner for determining whether the splicing screen unit is in the first row and the first column has been described in the above embodiment, and will not be repeated here.

At step five, when the splicing screen unit 61 determines that it is in the first row and the first column, the master control board of the splicing screen unit 61 determines an address identification command of the splicing screen unit 61. The address identification command carries information including first row, first column, random number and state of row-column identification. Then, the master control board sends the address identification command to the infrared emitters 1a, 2a, 3a, 4a of the splicing screen unit. Each of the infrared emitters 1a, 2a, 3a, 4a forwards the address identification command to the infrared receiver which belongs to the same group as each of the infrared emitters 1a, 2a, 3a, 4a or belongs to one group at an adjacent side of an adjacent splicing screen unit. When the infrared receiver 1b of the splicing screen unit 62 receives the address identification command sent from the infrared emitter 3a of the splicing screen unit 61, the infrared receiver 1b sends the address identification command to the master control board. The master control board determines that the splicing screen unit 62 is in the first row and the second column, according to the address identification command carrying information including first row and first column, and the address data of the infrared receiver 1b which sends the address identification command. Meanwhile, when the infrared receiver 2b of the splicing screen unit 64 receives the address identification command sent from the infrared emitter 4a of the splicing screen unit 61, the infrared receiver 2b sends the address identification command to the master control board of the splicing screen unit 64. The master control board determines that the splicing screen unit 64 is in the second row and the first column of the splicing screen, according to the address identification command carrying information including first row and first column, and the address data of the infrared receiver 2b which sends the address identification command.

At step six, the master control board of the splicing screen unit 62 sends the address identification command which indicates address information of the splicing screen unit to the infrared emitters 1a, 2a, 3a, 4a of other splicing screen units. When the infrared receiver 1b of the splicing screen unit 63 receives the address identification command sent from the infrared emitter 3a of the splicing screen unit 62, the infrared receiver 1b sends the address identification command to the master control board of the splicing screen unit 63. The master control board of the splicing screen unit 63 determines that the address of the splicing screen unit 63 is the first row and the third column, according to the address identification command carrying information including first row and second column, and the address data of the infrared receiver 1b which sends the address identification command. Meanwhile, when the infrared receiver 2b of the splicing screen unit 65 receives the address identification command sent from the infrared emitter 4a of the splicing screen unit 62, the infrared receiver 2b sends the address identification command to the master control board of the splicing screen unit 65. The master control board of the splicing screen unit 65 determines that the address of the splicing screen unit 65 is the second row and the second column, according to the address identification command carrying information including first row and second column, and the address data of the infrared receiver 2b which sends the address identification command. Further, the master control board of the splicing screen unit 65 generates an address identification command carrying address information of the splicing screen unit 65.

Meanwhile, the master control board of the splicing screen unit 64 sends the address identification command which indicates address information of the splicing screen unit 64 to the infrared emitters 1a, 2a, 3a, 4a of the splicing screen unit 64. When the infrared receiver 1b of the splicing screen unit 65 receives the address identification command sent from the infrared emitter 3a of the splicing screen unit 64, the infrared receiver 1b sends the address identification command to the master control board of the splicing screen unit 65. The master control board of the splicing screen unit 65 determines that the address of the splicing screen unit 65 is the second row and the second column, according to the address identification command carrying information including second row and first column, and the address data of the infrared receiver 1b which sends the address identification command. Further, the master control board of the splicing screen unit 65 generates an address identification command carrying address information of the splicing screen unit 65. Meanwhile, when the infrared receiver 2b of the splicing screen unit 67 receives the address identification command sent from the infrared emitter 4a of the splicing screen unit 67, the infrared receiver 2b sends the address identification command to the master control board of the splicing screen unit 67. The master control board of the splicing screen unit 67 determines that the address of the splicing screen unit 67 is the third row and the first column, according to the address identification command carrying information including second row and first column, and the address data of the infrared receiver 2b which sends the address identification command. Further, the master control board of the splicing screen unit 67 generates an address identification command carrying address information of the splicing screen unit 67.

At step seven, in a similar fashion, the splicing screen unit 66 determines that the address of the splicing screen unit 66 is the second row and the third column, according to the address identification command sent from the splicing screen unit 63 or the splicing screen unit 65 as well as the address data of the infrared receiver which sends the address identification command. The splicing screen unit 68 determines that the address of the splicing screen unit 68 is the third row and the second column, according to the address identification command sent from the splicing screen unit 65 or the splicing screen unit 67 as well as the address data of the infrared receiver which sends the address identification command. The splicing screen unit 69 determines that the address of the splicing screen unit 69 is the third row and the third column, according to the address identification command sent from the splicing screen unit 66 or the splicing screen unit 68 as well as the address data of the infrared receiver which sends the address identification command.

It should be noted, in one embodiment of the present disclosure, the method for determining addresses of splicing screen units is explained by taking one splicing screen including nine splicing screen units as an example. When one splicing screen includes more than nine splicing screen units, the principle of the method for determining addresses of splicing screen units is similar.

It should be noted, in the method for determining addresses of splicing screen units according to one embodiment of the present disclosure, it is first determined which splicing screen unit is in the first row and the first column of the splicing screen. Then, it is determined which splicing screen units are in the first row of the splicing screen and which splicing screen units are in the first column of the splicing screen according to address identification commands. After then, the splicing screen units in the first row and the splicing screen units in the first column send address identification commands to splicing screen units at an adjacent row or an adjacent column, respectively, so as to determine the address of each splicing screen unit in the splicing screen, thereby simplifying the process of determining addresses of splicing screen units and improving accuracy of results.

Figure 7:
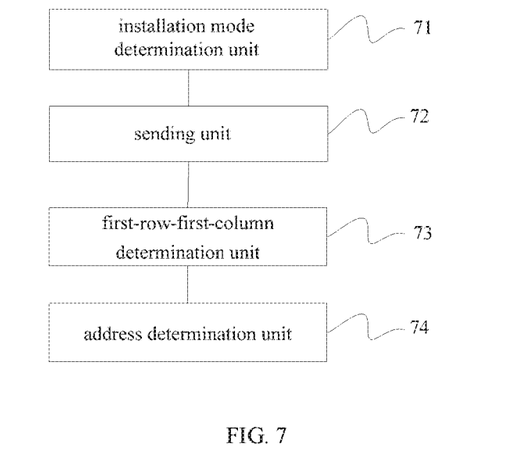
FIG. 7 is a schematic structural diagram of a master control board of the splicing screen unit according to one embodiment of the present disclosure.

FIG. 7 is a schematic structural diagram of a master control board of the splicing screen unit according to one embodiment of the present disclosure. Referring to FIG. 7, the master control board includes an installation mode determination unit 71, a sending unit 72, a first-row-first-column determination unit 73 and an address determination unit 74.

The installation mode determination unit 71 is to determine an installation mode of the splicing screen unit based on data obtained from the gravity sensor of the splicing screen unit.

The sending unit 72 is to send a command for acquiring address to each infrared emitter of the splicing screen unit.

The first-row-first-column determination unit 73 is to receive address data sent from the infrared receivers of the splicing screen unit, and determine whether the splicing screen unit is in the first row and the first column according to the address data and the installation mode. The address data from one infrared receiver indicates a position of the one infrared receiver, and is obtained by the one infrared receiver according to a command for acquiring address received by the one infrared receiver from one infrared emitter at an adjacent side of an adjacent splicing screen unit.

The address determination unit 74 is to, when determining that the splicing screen unit is in the first row and the first column, send an address identification command of the splicing screen unit to an adjacent splicing screen unit in an adjacent row and an adjacent splicing screen unit in an adjacent column; when determining that the splicing screen unit is not in the first row and the first column, determine an address of the splicing screen unit according to address identification commands received from adjacent splicing screen units in an adjacent row and/or an adjacent column as well as the address data sent from the infrared receivers in the splicing screen unit, and send an address identification command carrying address information of the splicing screen unit to an adjacent splicing screen unit in an adjacent row and an adjacent splicing screen unit in an adjacent column.

Optionally, the command for acquiring address includes state of first-row-first-column identification stage of the splicing screen unit which sends the command for acquiring address, and random number. The random number is used to determine whether one infrared emitter which forwards the command for acquiring address and one infrared receiver which receives the command for acquiring address belong to an identical group.

The address data sent from one infrared receiver may be address data indicating a position of the one infrared receiver, which is sent from the one infrared receiver when the one infrared receiver determines, according to the random number in the command for acquiring address, that the one infrared receiver which receives the command for acquiring address and one infrared emitter which forwards the command for acquiring address belong to different groups.

Optionally, the address identification command includes row information, column information of the splicing screen unit which sends the address identification command, and random number. The random number is used to determine whether one infrared emitter which forwards the address identification command and one infrared receiver which receives the address identification command belong to an identical group.

The way in which the address determination unit 74 determines an address of the splicing screen unit according to address identification commands received from adjacent splicing screen units in an adjacent row and/or an adjacent column as well as the address data sent from the infrared receivers in the splicing screen unit, includes: when determining that one infrared emitter which forwards one address identification command and one infrared receiver which receives the one address identification command belong to different groups according to the random number included in the one address identification command sent from one adjacent splicing screen unit in an adjacent row or an adjacent column, determining an address of the splicing screen unit according to row information and column information of the one address identification command as well as the address data sent from the infrared receivers in the splicing screen unit.

Optionally, the way in which the first-row-first-column determination unit 73 determines whether the splicing screen unit is in the first row and the first column according to the address data and the installation mode includes: when determining that the splicing screen unit is in the horizontal screen installation mode and receiving address data only from infrared receivers at the bottom side and the right side of the splicing screen unit, determining that the splicing screen unit is in the first row and the first column; or, when determining that the splicing screen unit is in the vertical screen installation mode and receiving address data only from infrared receivers at the top side and the right side of the splicing screen unit, determining that the splicing screen unit is in the first row and the first column.

Optionally, the way in which the address determination unit 74 sends an address identification command of the splicing screen unit to an adjacent splicing screen unit in an adjacent row and an adjacent splicing screen unit in an adjacent column, includes: sending, by the infrared emitter at the right side of the splicing screen unit, the address identification command of the splicing screen unit to the infrared receiver at the left side of one adjacent splicing screen unit in the adjacent column or row; sending, by the infrared emitter at the bottom side of the splicing screen unit, the address identification command of the splicing screen unit to the infrared receiver at the top side of one adjacent splicing screen unit in the adjacent row or column.

Optionally, the address identification commands received by the address determination unit 74 from adjacent splicing screen units in an adjacent row and/or an adjacent column include: an address identification command received by the infrared receiver at the top side of the splicing screen unit from the infrared emitter at the bottom side of one adjacent splicing screen unit in the adjacent row or column; and/or, an address identification command received by the infrared receiver at the left side of the splicing screen unit from the infrared emitter at the right side of one adjacent splicing screen unit in the adjacent column or row.

As described above, in the method for determining the address of each splicing screen unit in the splicing screen according to one embodiment of the present disclosure, after the master control board of the splicing screen unit determines the installation mode of the splicing screen unit according to the data received from the gravity sensor of the splicing screen unit, the master control board sends one command for acquiring address to each infrared emitter of the splicing screen unit. Then, each infrared emitter sends the command for acquiring address to the infrared receiver which belongs to the same group as the each infrared emitter or in a group different from the group to which the each infrared emitter belongs. When the master control board determines that the address of the splicing screen unit is the first row and the first column according to address data sent from the infrared receivers in the splicing screen unit as well as the installation mode, the master control board sends an address identification command of the splicing screen unit to an adjacent splicing screen unit in an adjacent row and an adjacent splicing screen unit in an adjacent column, to enable the adjacent splicing screen unit in the adjacent row and the adjacent splicing screen unit in the adjacent column to identify their own address. When the master control board determines that the address of the splicing screen unit is not the first row and the first column, the master control board determines an address of the splicing screen unit according to address identification commands received from adjacent splicing screen units in an adjacent row and/or an adjacent column as well as the address data sent from the infrared receivers in the splicing screen unit. As a result, each splicing screen unit can automatically identify its own address, thereby simplifying the process of determining addresses of the splicing screen units and improving accuracy of results.

The above are preferred embodiment of the disclosure. It is to be noted that, many improvements and modifications may be made by those ordinary skilled in the art without deviating from the principle of the disclosure, which improvements and modifications should be deemed as within the scope of protection of the disclosure.

What is claimed is:

1. A method for determining an address of each splicing screen unit of a splicing screen that comprises:
a plurality of splicing screen units which are spliced together; wherein each splicing screen unit comprises a master control board, a gravity sensor coupled with the master control board, infrared emitters and infrared receivers;
wherein the infrared emitters and the infrared receivers are divided into four groups each comprising one infrared emitter and one infrared receiver;
the four groups are at four sides including top, bottom, left and right sides of each splicing screen unit, respectively;
wherein two groups at adjacent sides of adjacent two splicing screen units, have an identical horizontal position or an identical vertical position; wherein in adjacent two splicing screen units, signal is capable of being transmitted among infrared emitters and infrared receivers of only two groups at adjacent sides of adjacent two splicing screen units;
wherein the method includes:
for each splicing screen unit, the master control board of the each splicing screen unit performing steps of:
determining an installation mode of the splicing screen unit based on data obtained from the gravity sensor of the splicing screen unit;
sending a command for acquiring address to each infrared emitter of the splicing screen unit;
receiving address data sent from the infrared receivers of the splicing screen unit, and determining whether the splicing screen unit is in the first row and the first column according to the address data and the installation mode, wherein the address data from one infrared receiver indicates a position of the one infrared receiver and is obtained by the one infrared receiver according to a command for acquiring address received by the one infrared receiver from one infrared emitter at an adjacent side of an adjacent splicing screen unit;
when determining that the splicing screen unit is in the first row and the first column, sending an address identification command of the splicing screen unit to an adjacent splicing screen unit in an adjacent row and an adjacent splicing screen unit in an adjacent column;
when determining that the splicing screen unit is not in the first row and the first column, determining an address of the splicing screen unit according to address identification commands received from adjacent splicing screen units in an adjacent row and/or an adjacent column as well as the address data sent from the infrared receivers in the splicing screen unit, and sending an address identification command carrying address information of the splicing screen unit to the adjacent splicing screen unit in the adjacent row and the adjacent splicing screen unit in the adjacent column.

2. The method of claim 1, wherein the command for acquiring address comprises: state of first-row-first-column identification stage of the splicing screen unit which sends the command for acquiring address, and random number;
wherein the random number is used to determine whether one infrared emitter which forwards the command for acquiring address and one infrared receiver which receives the command for acquiring address belong to an identical group;
the address data sent from one infrared receiver is address data which indicates a position of the one infrared receiver and which is sent from the one infrared receiver when the one infrared receiver determines, according to the random number in the command for acquiring address, that the one infrared receiver which receives the command for acquiring address and one infrared emitter which forwards the command for acquiring address belong to different groups.

3. The method of claim 1, wherein the address identification command comprises row information and column information of the splicing screen unit which sends the address identification command, and random number;
wherein the random number is used to determine whether one infrared emitter which forwards the address identification command and one infrared receiver which receives the address identification command belong to an identical group;
the step of determining an address of the splicing screen unit according to address identification commands received from adjacent splicing screen units in an adjacent row and/or an adjacent column as well as the address data sent from the infrared receivers in the splicing screen unit, comprises:
when determining that one infrared emitter which forwards one address identification command and one infrared receiver which receives the one address identification command belong to different groups according to the random number included in the one address identification command sent from one adjacent splicing screen unit in an adjacent row or an adjacent column, determining the address of the splicing screen unit according to row information and column information of the one address identification command as well as the address data sent from the infrared receivers in the splicing screen unit.

4. The method of claim 1, wherein the step of determining whether the splicing screen unit is in the first row and the first column according to the address data and the installation mode comprises:

when determining that the splicing screen unit is in the horizontal screen installation mode and receiving address data only from infrared receivers at the bottom side and the right side of the splicing screen unit, determining that the splicing screen unit is in the first row and the first column; or, when determining that the splicing screen unit is in the vertical screen installation mode and receiving address data only from infrared receivers at the top side and the right side of the splicing screen unit, determining that the splicing screen unit is in the first row and the first column.

5. The method of claim 1, wherein the step of sending an address identification command of the splicing screen unit to the adjacent splicing screen unit in the adjacent row and the adjacent splicing screen unit in the adjacent column, comprises:

sending, by the infrared emitter at the right side of the splicing screen unit, the address identification command of the splicing screen unit to the infrared receiver at the left side of one adjacent splicing screen unit in the adjacent column or row;

sending, by the infrared emitter at the bottom side of the splicing screen unit, the address identification command of the splicing screen unit to the infrared receiver at the top side of one adjacent splicing screen unit in the adjacent row or column.

6. The method of claim 1, wherein the address identification commands received from adjacent splicing screen units in the adjacent row and/or the adjacent column comprise:

an address identification command received by the infrared receiver at the top side of the splicing screen unit from the infrared emitter at the bottom side of one adjacent splicing screen unit in the adjacent row or column; and/or, an address identification command received by the infrared receiver at the left side of the splicing screen unit from the infrared emitter at the right side of one adjacent splicing screen unit in the adjacent column or row.

7. A master control board for each splicing screen unit of a splicing screen that comprises:

a plurality of splicing screen units which are spliced together; wherein each splicing screen unit comprises a master control board, a gravity sensor coupled with the master control board, infrared emitters and infrared receivers;

wherein the infrared emitters and the infrared receivers are divided into four groups each comprising one infrared emitter and one infrared receiver;

the four groups are at four sides including top, bottom, left and right sides of each splicing screen unit, respectively;

wherein two groups at adjacent sides of adjacent two splicing screen units, have an identical horizontal position or an identical vertical position; wherein in adjacent two splicing screen units, signal is capable of being transmitted among infrared emitters and infrared receivers of only two groups at adjacent sides of adjacent two splicing screen units;

wherein the master control board includes:

an installation mode determination unit configured to determine an installation mode of the splicing screen unit based on data obtained from the gravity sensor of the splicing screen unit;

a sending unit configured to send a command for acquiring address to each infrared emitter of the splicing screen unit;

a first-row-first-column determination unit configured to receive address data sent from the infrared receivers of the splicing screen unit, and determine whether the splicing screen unit is in the first row and the first column according to the address data and the installation mode; wherein the address data from one infrared receiver indicates a position of the one infrared receiver and is obtained by the one infrared receiver according to a command for acquiring address received by the one infrared receiver from one infrared emitter at an adjacent side of an adjacent splicing screen unit; and an address determination unit configured to, when determining that the splicing screen unit is in the first row and the first column, send an address identification command of the splicing screen unit to an adjacent splicing screen unit in an adjacent row and an adjacent splicing screen unit in an adjacent column; when determining that the splicing screen unit is not in the first row and the first column, determine an address of the splicing screen unit according to address identification commands received from adjacent splicing screen units in an adjacent row and/or an adjacent column as well as the address data sent from the infrared receivers in the splicing screen unit, and send an address identification command carrying address information of the splicing screen unit to an adjacent splicing screen unit in an adjacent row and an adjacent splicing screen unit in an adjacent column.

8. The master control board of claim 7, wherein the command for acquiring address comprises: state of first-row-first-column identification stage of the splicing screen unit which sends the command for acquiring address, and random number; the random number is used to determine whether one infrared emitter which forwards the command for acquiring address and one infrared receiver which receives the command for acquiring address belong to an identical group;

the address data sent from one infrared receiver is address data which indicates a position of the one infrared receiver and which is sent from the one infrared receiver when the one infrared receiver determines, according to the random number in the command for acquiring address, that the one infrared receiver which receives the command for acquiring address and one infrared emitter which forwards the command for acquiring address belong to different groups.

9. The master control board of claim 7, wherein the address identification command comprises row information and column information of the splicing screen unit which sends the address identification command, and random number; the random number is used to determine whether one infrared emitter which forwards the address identification command and one infrared receiver which receives the address identification command belong to an identical group;

a way in which the address determination unit determines the address of the splicing screen unit according to address identification commands received from adjacent splicing screen units in the adjacent row and/or the adjacent column as well as the address data sent from the infrared receivers in the splicing screen unit, comprises:
when determining that one infrared emitter which forwards one address identification command and one infrared receiver which receives the one address identification command belong to different groups according to the random number included in the one address identification command sent from one adjacent splicing screen unit in the adjacent row or the adjacent column, determining the address of the splicing screen unit according to row information and column information of the one address identification command as well as the address data sent from the infrared receivers in the splicing screen unit.

10. The master control board of claim 7, wherein a way in which the first-row-first-column determination unit determines whether the splicing screen unit is in the first row and the first column according to the address data and the installation mode comprises:
when determining that the splicing screen unit is in the horizontal screen installation mode and receiving address data only from infrared receivers at the bottom side and the right side of the splicing screen unit, determining that the splicing screen unit is in the first row and the first column; or,
when determining that the splicing screen unit is in the vertical screen installation mode and receiving address data only from infrared receivers at the top side and the right side of the splicing screen unit, determining that the splicing screen unit is in the first row and the first column.

11. The master control board of claim 7, wherein a way in which the address determination unit sends the address identification command of the splicing screen unit to the adjacent splicing screen unit in the adjacent row and the adjacent splicing screen unit in the adjacent column, comprises:
sending, by the infrared emitter at the right side of the splicing screen unit, the address identification command of the splicing screen unit to the infrared receiver at the left side of one adjacent splicing screen unit in the adjacent column or row;
sending, by the infrared emitter at the bottom side of the splicing screen unit, the address identification command of the splicing screen unit to the infrared receiver at the top side of one adjacent splicing screen unit in the adjacent row or column.

12. The master control board of claim 7, wherein the address identification commands received by the address determination unit from adjacent splicing screen units in the adjacent row and/or the adjacent column comprise:
an address identification command received by the infrared receiver at the top side of the splicing screen unit from the infrared emitter at the bottom side of one adjacent splicing screen unit in the adjacent row or column; and/or,
an address identification command received by the infrared receiver at the left side of the splicing screen unit from the infrared emitter at the right side of one adjacent splicing screen unit in the adjacent column or row.

* * * * *